(12) United States Patent
Rossman et al.

(10) Patent No.: US 11,838,296 B1
(45) Date of Patent: Dec. 5, 2023

(54) PROVIDING SECURE SOFTWARE PROJECT DEVELOPMENT ENVIRONMENTS

(71) Applicant: Amazon Technologies, Inc., Seattle, WA (US)

(72) Inventors: Hart Matthew Rossman, Vienna, VA (US); Eric Vanwieren, Auburn, GA (US); Eric Jason Brandwine, Haymarket, VA (US); Cameron John Maxwell, Preston (AU); Tyler Thomas Maklebust, Plymouth, MI (US); Nathaniel Schaaf, Elgin, SC (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 17/219,163

(22) Filed: Mar. 31, 2021

(51) Int. Cl.
*H04L 9/40* (2022.01)
*G06F 8/33* (2018.01)
*G06F 8/71* (2018.01)

(52) U.S. Cl.
CPC .............. *H04L 63/126* (2013.01); *G06F 8/33* (2013.01); *G06F 8/71* (2013.01); *H04L 63/20* (2013.01)

(58) Field of Classification Search
CPC ......... H04L 63/126; H04L 63/20; G06F 8/33; G06F 8/71

USPC ............................................................ 726/4
See application file for complete search history.

(56) References Cited

U.S. PATENT DOCUMENTS

| | | | |
|---|---|---|---|
| 2010/0325613 A1* | 12/2010 | Bush ...................... | G06Q 10/06 717/120 |
| 2011/0099549 A1* | 4/2011 | Sriraghavan ......... | G06Q 10/109 718/100 |
| 2018/0239898 A1* | 8/2018 | Haerterich ............ | G06F 21/577 |
| 2020/0285462 A1* | 9/2020 | Sabath ..................... | G06F 8/33 |

\* cited by examiner

*Primary Examiner* — Michael S McNally
(74) *Attorney, Agent, or Firm* — Nicholson De Vos Webster & Elliott LLP

(57) ABSTRACT

Techniques are described for providing software developers with secure software project development environments via cloud-based or locally installed integrated development environments (IDEs). A cloud provider network provides a project development environment policy service that enables users to configure project development environment policies associated with various software projects and to deploy configured policies to users' project development environments as appropriate. A project development environment policy can include rules related to monitoring and controlling version control system actions, monitoring the content of project source code pushed to version control repositories, among other software project governance-related configurations.

20 Claims, 8 Drawing Sheets

US 11,838,296 B1

PROVIDING SECURE SOFTWARE PROJECT DEVELOPMENT ENVIRONMENTS

BACKGROUND

An integrated development environment, or IDE, is a software application that provides software developers with a comprehensive set of tools for software development. The tools provided by an IDE typically include, for example, a source code editor, a debugger, a compiler or interpreter, and other build tools. Many IDEs further provide integrations with various types of version control systems such as, e.g., the popular Git® software. Version control software enables users to track changes to source code during software development, thereby enabling software developers to collaborate on software projects more effectively and to maintain a record of changes to the source code over time.

BRIEF DESCRIPTION OF DRAWINGS

Various embodiments in accordance with the present disclosure will be described with reference to the drawings, in which.

DETAILED DESCRIPTION

Figure 1:
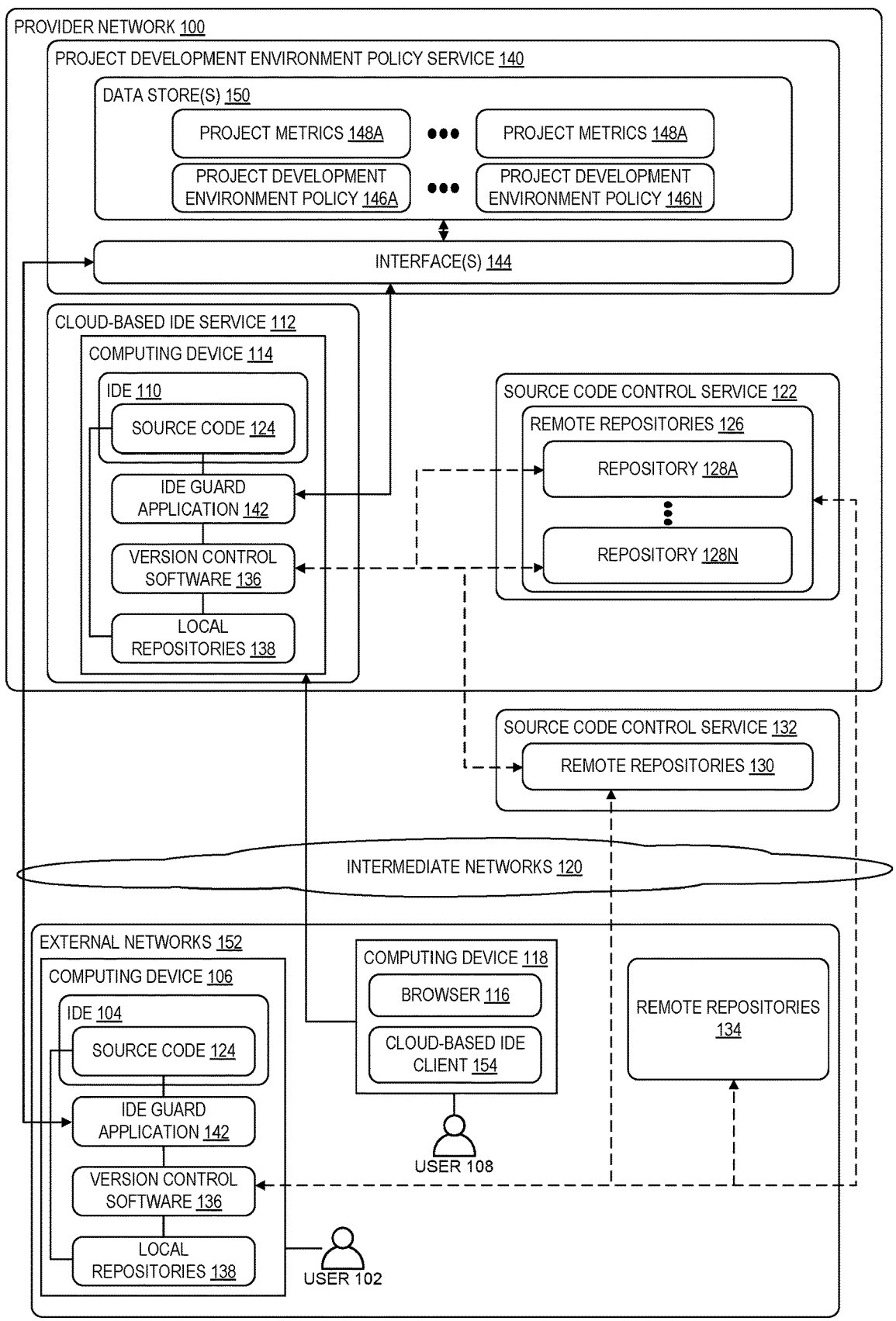
FIG. 1 is a diagram illustrating an environment for providing software developers with secure software development environments via deployable integrated development environment (IDE) guard applications and associated project development environment policies according to embodiments.

The present disclosure relates to methods, apparatus, systems, and non-transitory computer-readable storage media for providing software developers with secure software project development environments using either cloud-based or locally installed integrated development environments (IDEs). According to embodiments described herein, a cloud provider network provides a project development environment policy service that enables users to configure project development environment policies associated with various software projects and to deploy configured policies to users' project development environments as appropriate. As described in more detail herein, a project development environment policy can include permissions related to monitoring and controlling version control system actions, monitoring the content of project source code pushed to version control repositories, among other software project governance-related configurations.

As an example, in the case of a software developer using an IDE installed locally on a computing device issued to the developer, in some embodiments, a project development environment policy can be applied to the developer's IDE environment via an IDE guard application installed on the developer's computing device and which monitors certain actions performed on the device in connection with one or more software projects. In other scenarios where a developer uses a cloud-based IDE to work on or more projects, a similar application may be integrated with the implementation of the cloud-based IDE. Examples of policy permissions that can be enforced by such an application include preventing users from inadvertently pushing source code associated with a project into an unintended repository (e.g., into a public repository or other repository associated with a different project), preventing users from inadvertently pushing source code containing security credentials or other secret material into any repository, and generally managing the governance of build and deployment environments. Among other benefits, the techniques described herein for securing users' software project development environments increases the security of software development environments and workflows, improves the efficiency of software development workflows by preventing certain types of time-consuming errors, and generally enables users to readily develop software in a secure environment with minimal configuration on the part of the developer.

As indicated, software developers today develop software using a wide range of development environments including, for example, development environments configured locally on employer or client-issued computing devices, development environments configured on personal computing devices, cloud-hosted development environments, and the like. One common aspect of these and other types of software development environments involves the use of version control systems to manage the source code associated with various projects that a developer might be working on at any given time including, e.g., employer-owned software projects, public software projects, personal projects, and the like. The use of such version control systems typically includes, for example, creating local "clones" of remote repositories containing relevant project source code and other files, committing local changes made to files by developers using an IDE or other editor, pushing committed changes to remote repositories, among other actions. In general, the use of such version control systems enables developers to efficiently collaborate on software projects with others by managing the synchronization of project files as multiple developers make changes to a same project over time.

When using development environments such as those as described above and others, developers generally strive to ensure that project files and other materials associated with one project are not inadvertently comingled with the materials of another project. Despite best efforts, however, one common scenario where such comingling can occur is during version control-related processes. As indicated above, while attempting to make use of such software, a developer might inadvertently push a customer's code to a public repository, push code associated with a first customer to a second customer's repository, inadvertently push security credentials or other sensitive information to a public repository or to a customer's repository, push material owned by the developer's employer to a public repository or to a customer's repository, among other undesirable occurrences. Furthermore, the number of potentially undesirable scenarios and the likelihood that such scenarios might occur typically increases as developers become involved in more projects and work across multiple separate development environments.

These challenges, among others, are addressed by the described techniques for securing software developers' project environments using project development environment policies configured using a cloud-based service and managed in coordination with locally installed or cloud-hosted IDE guard applications. As indicated above, the application of these policies can be used to prevent developers from inadvertently performing undesirable source code control actions and can further provides metrics and usage data beneficial to those managing the governance of software projects, among other features. Using such tools, software developers can readily access secure software development environments using either locally installed or web-based IDEs with minimal configuration on the part of the developer, and software project managers can better manage the security of project resources, among other benefits.

FIG. 1 is a diagram illustrating an environment for providing software developers with secure software development environments via deployable project development environment policies according to embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 120 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, an on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated, software developers today develop software using a wide range of development environments including, for example, IDEs installed locally on computing devices issued to or owned personally by developers, using web-hosted IDEs, etc., and often work on several different software projects at any given time across these environments. As such, managing the security of the resources associated with each of such projects and ensuring that resources stay within project boundaries presents several challenges. According to embodiments described herein, a project development environment policy service 140 and associated IDE guard application 142 enable the ready configuration of secure project development environments in any of the computing environments described above and others.

In the example of FIG. 1, two different types of software development environments are shown: a first user 102 is shown using an IDE 104 running locally on a computing device 106, while a second user 108 is shown using a cloud-based IDE 110 provided by a cloud-based IDE service 112 of the provider network 100 and hosted on a computing device 114. In the second example, the user accesses the cloud-based IDE 110 using a web browser 116 or other application running on a computing device 118. The computing devices used by each of user 102 and user 108 generally may be coupled to any network 152 external to the provider network 100 (e.g., a network managed by an external business entity, a public network, or a private personal network at a user's home) or may be coupled to the provider network 100. In some embodiments, the cloud-based IDE service 112 provides cloud-based IDEs that enable users to write, run, and debug code using a web browser. In some embodiments, an IDE 110 provided by the cloud-based IDE service 112 includes a code editor, debugger, terminal, among other possible tools. IDEs provided by the cloud-based IDE service 112 are prepackaged with tools for popular programming languages (e.g., JavaScript, Python, PHP, etc.) such that users need not install files or configure development machines to start new projects. In some embodiments, a cloud-based IDE service 112 is further integrated with source code control services 122, continuous delivery services, code deployment services, security monitoring services, logging services, and other possible services provided by the provider network 100. In some embodiments, users can access a cloud-based IDE environment using a cloud-based IDE client 154 instead of a browser, where the client 154 is a native desktop application implementing an IDE that interfaces with a backend service. In other embodiments, the client 154 can include digital workspace software that allows users to remotely access an IDE running in the cloud or other external location.

In FIG. 1, each of IDE 104 and IDE 110 enables users to edit and perform other operations on source code (e.g., source code 124), where such source code may be associated with one or more software projects on which the associated users are working. For example, using the respective IDEs, the users generally can create, modify, compile, debug, and deploy software applications based on the source code under development. In some embodiments, the source code can include source code obtained from one or more repositories managed by version control systems. Examples of repositories from which such source code may be obtained can include, for example, remote repositories 126 including repository 128A, . . . , repository 128N hosted by a source code control service 122 of a provider network 100, remote repositories 130 hosted by one or more public source code control services 132, or private remote repositories 134 hosted by a business entity, organization, or for personal use. In some embodiments, users can use version control software 136 to obtain or create "clones" of existing remote repositories, resulting in the creation of local repositories 138.

A user typically uses an IDE to work on source code associated with one or more defined software projects. For example, a software developer employed by the provider network 100 might work on an internal software project related to a service provided by the provider network 100, where source code associated with the software project may be stored in a repository of the source code control service 122 or other location. As another example, the same software developer or another developer might work on an open-source software project including source code hosted by a public source code control service 132. As yet another example, a software developer might work on a software project for a client (or customer) of the software developer, where the project source code is hosted in one or more private repositories 134 or might further work on one or more personal projects hosted in one or more private repositories 134. Furthermore, at any given time, a software developer might typically be working on any combination of two or more of the types of software projects described above (e.g., a developer associated with the provider network 100 might be working on an internal project associated with the provider network, two or more separate projects for respective customers, and one or more personal projects).

In many of the example scenarios described above, users strive to ensure that the source code and other software project materials associated with one project are not inadvertently comingled with the materials of another project. Despite developers' best efforts, one common scenario where such comingling can occur is during version control-related processes. For example, once a user edits source code 124 associated with a software project, the user typically uses version control software 136 to commit changes made to the source code, create branches, and push commits to remote repositories. As indicated above, these processes introduce several points for potential mistakes to be made— e.g., code can be accidentally pushed to a different project's repository, pushed to a public repository, pushed with misconfigured credentials, etc. In the case of proprietary source code, such mistakes can be costly and potentially create security issues.

In some embodiments, to enable users to define and deploy secure development environments, a project development environment policy service 140 and associated IDE guard applications 142 are provided. A project development environment policy service 140 enables users (e.g., software project administrators) to configure project development environment policies on a per-project basis, enables software developers to register development environments and to develop software projects, and to view metrics generated by IDE guard applications reflecting operations performed within development environments. In some embodiments, the project development environment policy service 140 is accessible via interfaces 144, which can be accessed using defined APIs, web-based consoles, CLIs, etc. As described herein, such interfaces 144 can be used, for example, to setup software project definitions, to configure associated project development environment policies (e.g., project development environment policy 146A, . . . , project development environment policy 146N), to deploy policies to project development environments via IDE guard applications, and to obtain and store project metrics (e.g., project metrics 148A, . . . , project metrics 148N) in data store(s) 150.

Figure 2:
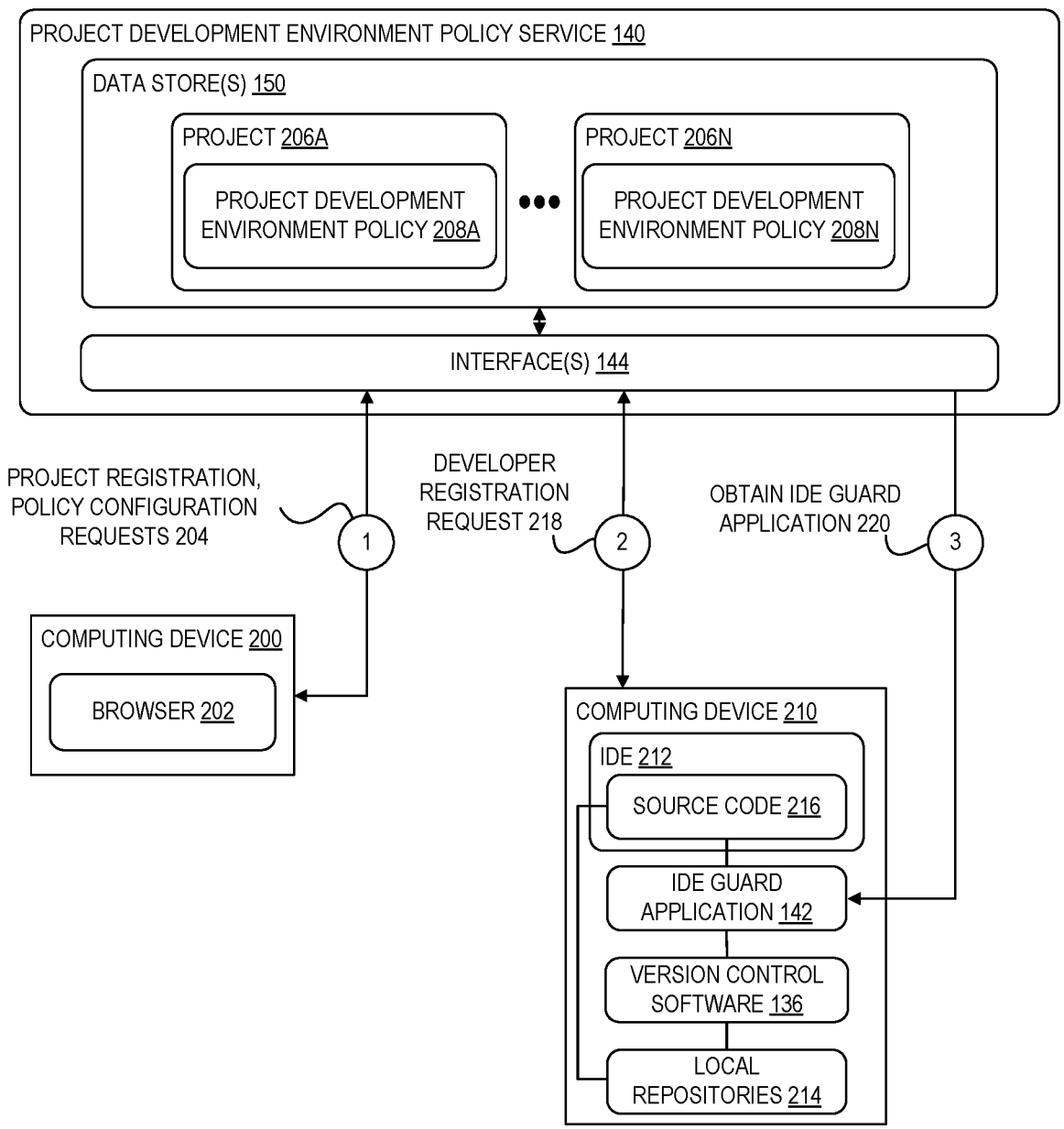
FIG. 2 is a diagram illustrating a process including a user registering a software project, configuring an associated project development environment policy, a developer registering a project development environment associated with the software project, and obtaining an IDE guard application to be used to enforce the associated project development environment policy according to embodiments.

As indicated, in some embodiments, users can create software project definitions used to represent software-related projects that developers will work on and to which one or more project development environment policies can be attached. FIG. 2 is a diagram illustrating a process including a user registering a software project, configuring an associated project development environment policy, a developer registering a project development environment associated with the software project, and obtaining an IDE guard application to be used to enforce any associated project development environment policies according to embodiments. As shown at circle "1," in some embodiments, a user may initially interact (e.g., via a web-based console accessible using a browser 202, CLI, API, etc.) with the project development environment policy service 140 using a computing device 200 and send requests 204 register one or more software projects (e.g., one or more of project 206A, . . . , project 206N) and to configure associated project development environment policies (e.g., one or more of project development environment policy 208A, . . . , project development environment policy 208N).

In some embodiments, a project is represented by a data structure identifying some or all the following data items: a name or other identifier of the project, identifiers of one or more repositories containing files associated with the project (e.g., a URL of the remote repositories), identifiers of one or more users associated with the project (e.g., usernames, emails, etc.), identifiers of one or more computing devices at which project development environments associated with the project have been or will be deployed, security tokens associated with the one or more computing devices, and a status of the project (e.g., active, suspended, archived, etc.). In some embodiments, these data items can be provided via a web-based interface provided by the project development environment policy service 140 or any other interface 144.

In some embodiments, a project development environment policy defines a set of permissions or rules to be applied to instances of a project development environment deployed at various computing devices (e.g., at a computing device 210 to be used by a developer associated with the project). As described herein, a user can create an instance of a project development environment using a computing device or web-based IDE to register the user as being associated with the project. In some embodiments, once registered, a user can request access to a registered project development environment by accessing an associated IDE provided by a cloud-based IDE service 112, by selecting an option presented in a cloud-based or local IDE 212, by providing input to an IDE guard application 142 requesting access to the project development environment, or the like, where a corresponding project development environment policy is applied once the environment is accessed. In some embodiments, project development environment policies are applied automatically and without a user requesting access, e.g., based on monitoring local repositories 214 located on a developer's computing device 210 and associated source code 216.

In some embodiments, a project development environment policy defines a set of permissions or rules to be applied to a software project regardless of where the project is being developed. For example, a policy can include a set of logical directives or permissions specifying actions to be performed responsive to certain detected events, actions that are not permitted to occur, and the like. In some embodiments, an IDE guard application 142 is able to evaluate and apply the logical directives and permissions specified in a policy in connection with the use of an IDE running on a computing device or in the cloud. A project may be associated with a pre-defined set of users and/or computing devices at which an instance of a development environment is permitted (e.g., a pre-defined set of computing devices to be provided to developers associated with the project) or otherwise associated with users that have successfully requested registration. In some embodiments, a software project and project development environment policy can be associated with a downloadable image of an IDE that can be installed on user's computing devices with access to the associated project code, where the image includes an IDE guard application 142 and policy associated with the software project.

In some embodiments, a project development environment policy includes a set of one or more permissions or rules dictating which actions are and are not permitted, types of validations to be performed, and other types of actions to be performed during various points in the software development cycle. For example, a project development environment policy can include permissions defining remote repositories to which it is permitted to push source code from one or more local repositories, various validations to be performed responsive to detecting an invocation of a commit command (e.g., configuring expected configurations of usernames and emails), and the like. In some embodiments, a project development environment policy may further include indications of processes expected to be performed as part of the project development cycle. For example, a project development environment policy can specify whether code review processes, penetration tests, load tests, or other types of processes are to be performed responsive to the invocation of a push, deploy, or other command. In some embodiments, a project development environment policy is specified in a policy language that enables users to express policy conditions related to the use of IDEs, version control software, and other software development-related applications. Once a software project is no longer under development, in some embodiments, a project definition and associated project development environment policy definitions can be archived and saved for later use. The project development environment policy service 140 may provide policy templates that users can customize for their own software projects.

In some embodiments, at circle "2," a user (e.g., a software developer associated with the project) requests registration 218 of a new project development environment associated with a defined software project. In some embodiments, a user requests registration by accessing an interface provided by the project development environment policy service 140 (e.g., a web-based console interface) and provides input requesting registration, e.g., including an identifier of the user such as an email address and optionally a password for the project. In other embodiments, a message (e.g., an email) is sent to users identified as being associated with the project during project registration process that users can use to request registration of a project development environment. The project development environment policy service 140 may then confirm whether the requesting user is associated with the requested software project and otherwise validate the request to register the project development environment.

In some embodiments, users successfully requesting registration of a project development environment may be provided with a URL or other means to download an IDE guard application 142, which the user can then install if not already present on the user's computing device. In some embodiments, the project development environment policy service 140 further generates a security token to be provided in association with the IDE guard application 142 that the application can then use when making requests to the service 140 (e.g., to obtain policies, send usage metrics, etc.). In some embodiments, the project development environment policy service 140 stores data in a data store 150 associating the user, the computing device, the generated security token, and the project, among other possible information. In some embodiments, the IDE guard application 142 may further periodically request an updated security token from the project development environment policy service 140 (e.g., responsive to a security token expiring). In some embodiments, an automated device management tool or service is used to automatically deploy an IDE guard application 142 and optionally an IDE 212 to computing devices associated with a defined project (e.g., computing devices assigned to developers working on a particular project).

In some embodiments, at circle "3" in FIG. 2, the user obtains 220 the IDE guard application 142. The IDE guard application 142 generally can be any type of software application including a standalone application, a plugin to an IDE or version control software, one or more scripts, or any combinations thereof. In some embodiments, the IDE guard application 142 is bundled with an IDE 104, version control software 136, machine image, or the like. In some embodiments, during installation of the IDE guard application 142, the user may be prompted to provide an email address, the user's name, and a computing device identifier to be associated with a provided security token, where such information may be sent back to the project development environment policy service 140. The project development environment policy service 140 can then store the information in a database or other data store 150 and return a message indicating whether the registration was successful. In some embodiments, the installation of the IDE guard application 142 includes generating an inventory of local repositories 214 on the computing device, sending information about the local repositories to the project development environment policy service 140, installing hooks for the version control software 136 for relevant repositories used to implement policy permissions, among other actions. The generated inventory of local repositories, for example, can be used to help ensure that source code from unassociated public or private software projects is not inadvertently comingled with source code of one or more employer- or client-owned projects, among other uses.

As indicated, the IDE guard application 142 is configured to monitor actions performed in connection with an IDE 212, version control software 136, and possibly other applications. In some embodiments, the IDE guard application 142 further applies one or more associated project development environment policies as part of monitoring such actions. The project development environment policies can be obtained by the IDE guard application 142 once the application is installed (e.g., by sending requests to the project development environment policy service 140 for policies relevant to any projects associated with the registered development environment) or the policies may be included with the IDE guard application 142. In some embodiments, responsive to detecting invocation of an action involving a local repository that is not associated with configuration in a project development environment policy, the IDE guard application 142 may prompt a user to configure policies for the repository. For example, the configuration may request the user to provide a username and email associated with the repository and to identify one or more domains associated with remote repositories to which pushes of code in the local repository are permitted.

Figure 3:
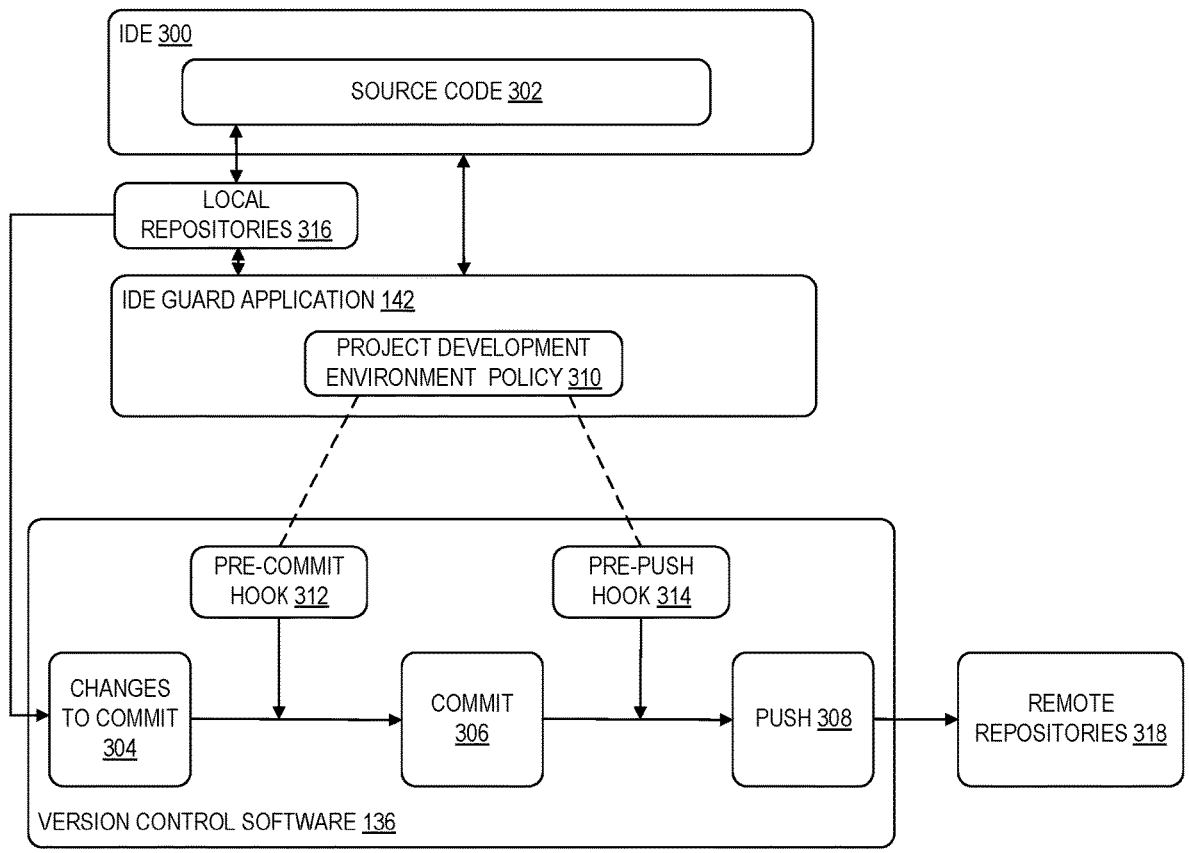
FIG. 3 is a diagram illustrating the use of version control software hooks to apply project development environment policies responsive to detecting certain events involving local repositories according to some embodiments.

As indicated, in some embodiments, the IDE guard application 142 monitors and controls the execution of certain actions in part by integrating with version control software 136 running on computing devices. In some embodiments, the integration involves the installation of hooks or scripts configured to execute automatically when certain events occur relative to repositories managed by version control software 136. FIG. 3 illustrates the use of version control software hooks to apply project development environment policies responsive to detecting events associated with a local repository according to some embodiments.

In FIG. 3, an IDE 300 is shown in association with source code 302, which a user may be editing as part of a software project. As part of development the software, a uses version control software 136 at various times, e.g., to make changes 304 to files in a local repository 316 tracking the source code 302, to commit 306 changes made to the file(s), and to push 308 the changes to a remote repository 318. As indicated, in some embodiments, an IDE guard application 142 installs hooks that are configured to run before, after, or during some of these events and can apply various permissions and perform other actions associated with a project development environment policy 310. For example, during installation of an IDE guard application 142, a pre-commit hook 312 and a pre-push hook 314 may be installed on users' computing devices via a shell script (e.g., by placing the scripts in a certain folder associated with the version control software 136). In some embodiments, the IDE guard application 142 is installed in connection with an IDE 300 provided by a cloud-based IDE service 112, e.g., by including the IDE guard application 142 in an image or other installation package used to deploy the web-based IDEs. As described herein, the hooks can be used to validate configuration information associated with invocations of commit and push commands (e.g., validate that a username and email address associated with the commands match those found in version control software 136 configuration files, match the username and email address provided during configuration of the IDE guard application 142, etc.), to ensure that invocations of a push command are not associated with an unpermitted domain (e.g., a domain associated with a public repository, a domain not included in a defined set of allowed domains, etc.), and the like.

Figure 4:
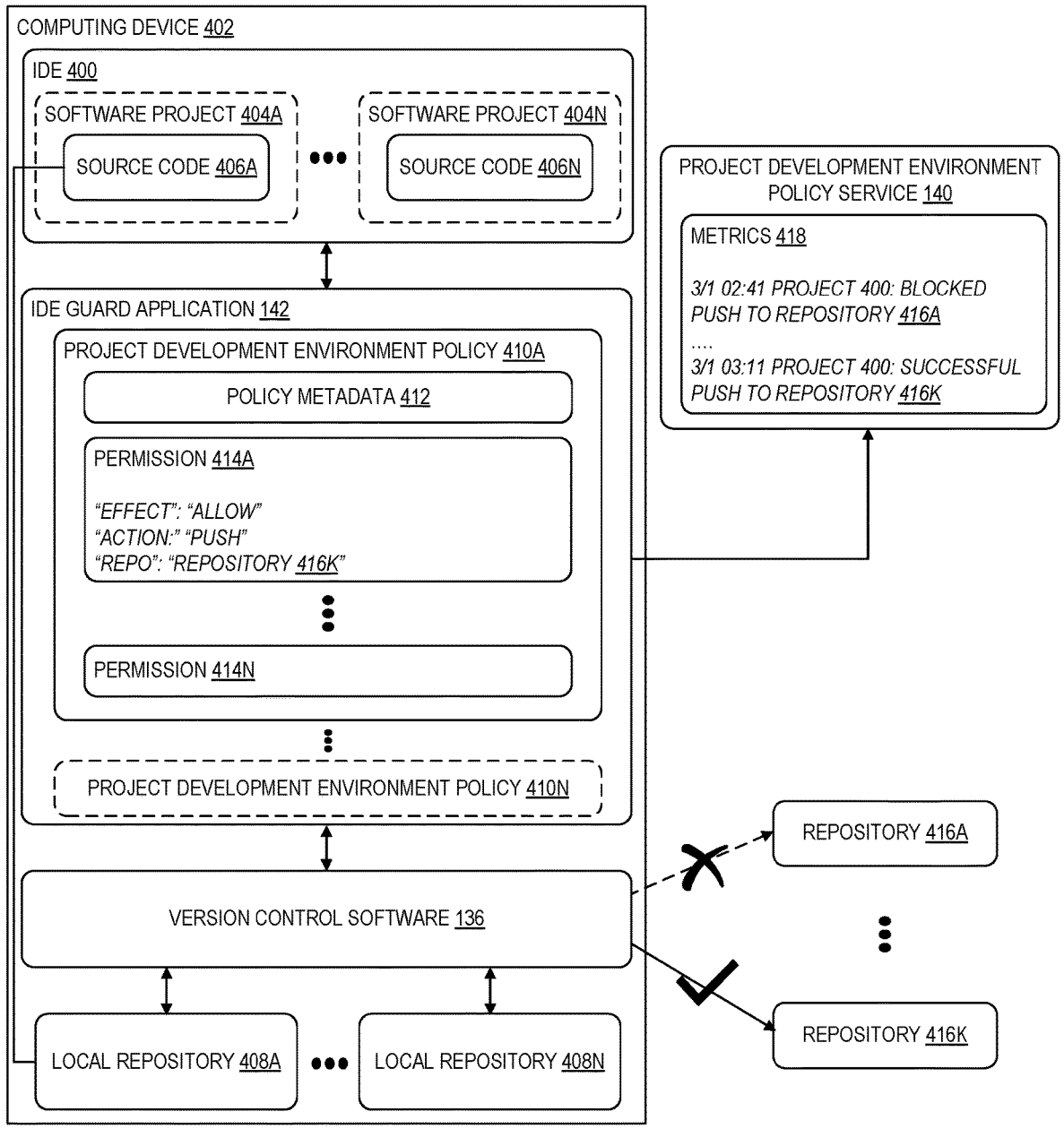
FIG. 4 is a diagram illustrating the application of a project development environment policy to monitor and control actions involving source code of a software project with which the policy is associated according to some embodiments.

In some embodiments, once installed, the hooks or other components of the IDE guard application 142 can monitor various actions performed in connection with the project development environment. FIG. 4 illustrates an IDE guard application applying a project development environment policy in a project development environment according to some embodiments. In the example of FIG. 4, a user is using an IDE 400 installed on a computing device 402 to work one or more software projects 404A, . . . , software project 404N. Each the software projects is associated with source code (e.g., source code 406A, . . . , source code 406N), at least a part of which may have been cloned from a remote repository and is stored in a local repository (e.g., one or more local repository 408A, . . . , local repository 408N).

As indicated above, in some embodiments, the IDE guard application 142 includes hooks or other mechanisms for detecting events related to the use of the IDE 400, version control software 136, or other actions related to a software project. In the example of FIG. 4, the IDE guard application 142 includes or has obtained one or more project development environment policies (e.g., project development environment policy 410A, . . . , project development environment policy 410N) associated with one or more registered software project development environments at the computing device 402. As shown, a project development environment policy 410A may include policy metadata 412 including, e.g., a name of the associated software project, an identifier of one or more local repositories to which the policy applies, an identifier of an associated security token, a time the policy was created and last updated, etc. The project development environment policy 410A further includes a set of permissions 414A, . . . rule 414N. As illustrated by the example permission 414A, each permission may define one or more permitted or denied actions (e.g., to allow pushes to a remote repository 416K in this example). In some embodiments, actions that are not explicitly permitted by a permission may be denied by default or a user may be prompted before performing an action that is not permitted by a permission.

In the example of FIG. 4, it is shown that an attempted invocation of a push command including arguments identifying a remote repository 416A was blocked by the IDE guard application 142 because the project development environment policy 410A does not include a permission permitting changes to be pushed to the repository or may include a rule denying all pushes to a public repository, etc. The example in FIG. 4 further illustrates that an invocation of a push command including arguments identifying the repository 416K was permitted, e.g., based on the explicit permissions provided in permission 414A.

The examples above illustrate the IDE guard application 142 monitoring and controlling invocations of a command to push changes from a local repository to a remote repository, although many other types of policies are possible. For example, in some embodiments, responsive to detecting invocation of a commit command using the version control software 136, the IDE guard application 142 may confirm that the username and user email match those included in configuration data associated with the version control software 136. In some embodiments, a project development environment policy can further perform validations of the source code, validation of identity and access management policies associated with a software project, and the like. For example, in some embodiments, the validations include determining whether source code associated with a commit or push includes security credentials in the source code, where the IDE guard application 142 may block such actions if detected.

In some embodiments, interactions monitored and controlled by an IDE guard application 142 are reported to the project development environment policy service 140. Examples of actions for which metrics are collected can include configuring a policy, invocations of a commit or push command, the creation or deletion of local repositories, etc. In some embodiments, metrics generated and reported by an IDE guard application 142 includes some or all of the following: an email address for the user, an identifier of the computing device at which the IDE guard application 142 is running, an action that was invoked (e.g., a commit, push, or other action), an identifier of a repository associated with the action, a time at which the action was invoked, an identifier of a local directory in which the action was invoked, and an indication of whether the action was permitted, blocked, successful, failed, etc. In some embodiments, the metrics can be used by the project development environment policy service 140 to generate reports or to alert users to the occurrences of certain types of actions. For example, in FIG. 4, the IDE guard application 142 sends metrics 418 indicating that the application blocked the attempted push to repository 416A, while the invocation of the push command involving the repository 416K completed successfully.

In some embodiments, the IDE guard application 142 provides live feedback in a user's IDE 400 based on application of a policy. For example, if a policy includes permissions restricting the inclusion of secret material in the source code, the IDE guard application 142 can detect the presence of such source code material while a user is editing the source code and can display an alert in response. In general, the IDE guard application 142 can perform any such checks against the source code or other project materials in real time as a user is editing a software project and can display alert messages before a user may perform any particular action via the IDE 400 or version control software 136.

Figure 5:
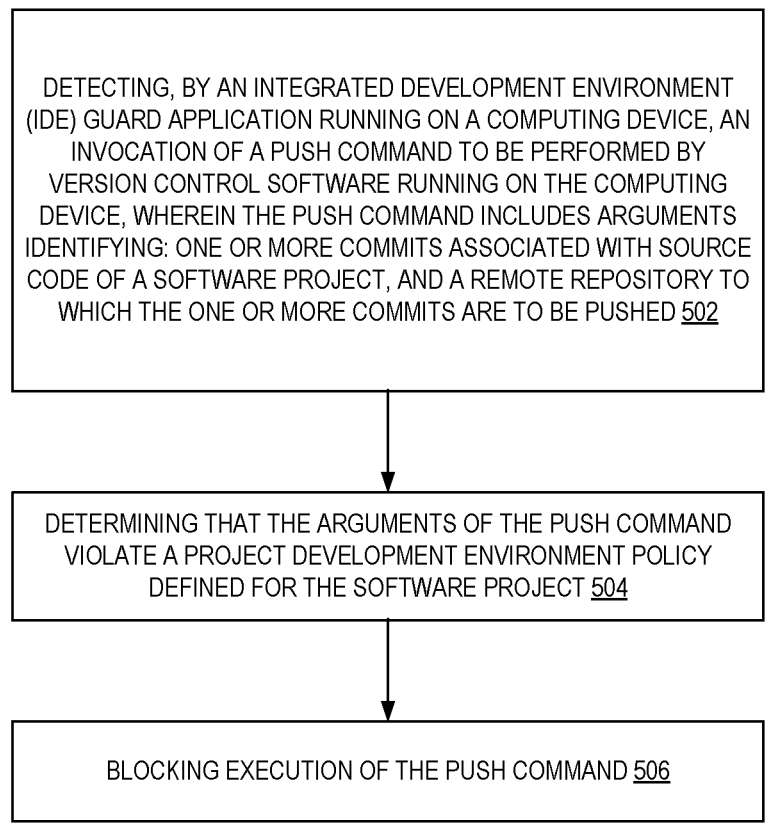
FIG. 5 is a flow diagram illustrating operations of a method for providing software developers with secure software project development environments using either cloud-based or locally installed integrated development environments (IDEs) according to some embodiments.

FIG. 5 is a flow diagram illustrating operations 500 of a method for providing software developers with secure software project development environments via cloud-based or locally installed integrated development environments (IDEs) according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an IDE guard application 142, project development environment policy service 140, cloud-based IDE service, or combinations thereof, of the other figures.

The operations 500 include, at block 502, detecting, by an integrated development environment (IDE) guard application running on a computing device, an invocation of a push command to be performed by version control software running on the computing device, wherein the push command includes arguments identifying: one or more commits associated with source code of a software project, and a remote repository to which the one or more commits are to be pushed.

The operations 500 further include, at block 504, determining that the arguments of the push command violate a project development environment policy defined for the software project.

The operations 500 further include, at block 506, blocking execution of the push command.

In some embodiments, the source code is first source code associated with a first software project and the project development environment policy is a first project development environment policy, and wherein the operations further include: receiving a request to access second source code associated with a second software project, wherein the second software project is associated with a second project development environment policy that is different from the first project development environment policy; detecting an invocation of a second push command to be performed by the version control software, wherein the second push command includes arguments identifying: one or more commits associated with the second source code, and a remote repository to which the one or more commits are to be pushed; determining that the second push command is permitted by the second project development environment policy; and allowing execution of the second push command.

In some embodiments, the operations further include sending, to a project development environment policy service, data reflecting application of the project development environment policy to the invocation of the push command, wherein the data includes a timestamp and an indication that execution of the push command was blocked.

In some embodiments, the push command is a first push command, and the operations further include: detecting an invocation of a second push command, wherein the second push command includes arguments identifying one or more commits associated with the source code of the software project; determining that source code associated with the one or more commits includes security credentials; and blocking execution of the second push command.

In some embodiments, the operations further include obtaining, by the IDE guard application, the project development environment policy defined for the software project from a project development environment policy service of a cloud provider network, and wherein the project development environment policy identifies at least one repository associated with the software project.

In some embodiments, the operations further include sending, to a project development environment policy service, a request identifying a machine identifier of the computing device; and receiving, from the project development environment policy service, a security token generated for the computing device.

In some embodiments, the operations further include determining that a domain associated with the remote repository is not included in a set of allowed domains defined by the project development environment policy, and wherein the remote repository is at least one of: a public repository hosted by a repository hosting service, or a repository associated with a different software project.

In some embodiments, the operations further include detecting an invocation of a commit command to be performed by version control software running on the computing device, wherein the commit command identifies a local repository and a username and an email address; determining that the username or the email address does not match a configured username and email address for the local repository; and blocking execution of the commit command.

In some embodiments, the IDE guard application integrates with an integrated development environment (IDE) hosted by an IDE service provided by a cloud provider network, and wherein the IDE is accessed via a web browser.

In some embodiments, the operations further include installing one or more scripts configured to execute responsive to the version control software receiving a commit command or a push command, and wherein the one or more scripts, upon execution, determine that the arguments of the push command violate the project development environment policy defined for the software project.

In some embodiments, the operations further include detecting an invocation of a commit command, wherein the commit command includes arguments identifying a repository not defined in the project development environment policy; prompting a user to provide configuration information for the repository, wherein the configuration information includes an email address and an allowed domain associated with the repository; and sending the configuration information to a project development environment policy service.

In some embodiments, the push command is a first push command, and the operations further include: detecting an invocation of a second push command, wherein the second push command includes arguments identifying a second remote repository; determining that a domain associated with the second remote repository is included in a set of allowed domains defined by the project development environment policy; and prompting a user to confirm the invocation of the second push command to the second remote repository.

In some embodiments, the operations further include identifying, by the IDE guard application, a set of local repositories stored on the computing device; and sending, to a project development environment policy service, identifiers of the local repositories of the set of local repositories.

In some embodiments, the IDE guard application is installed as a plugin to an IDE.

Figure 6:
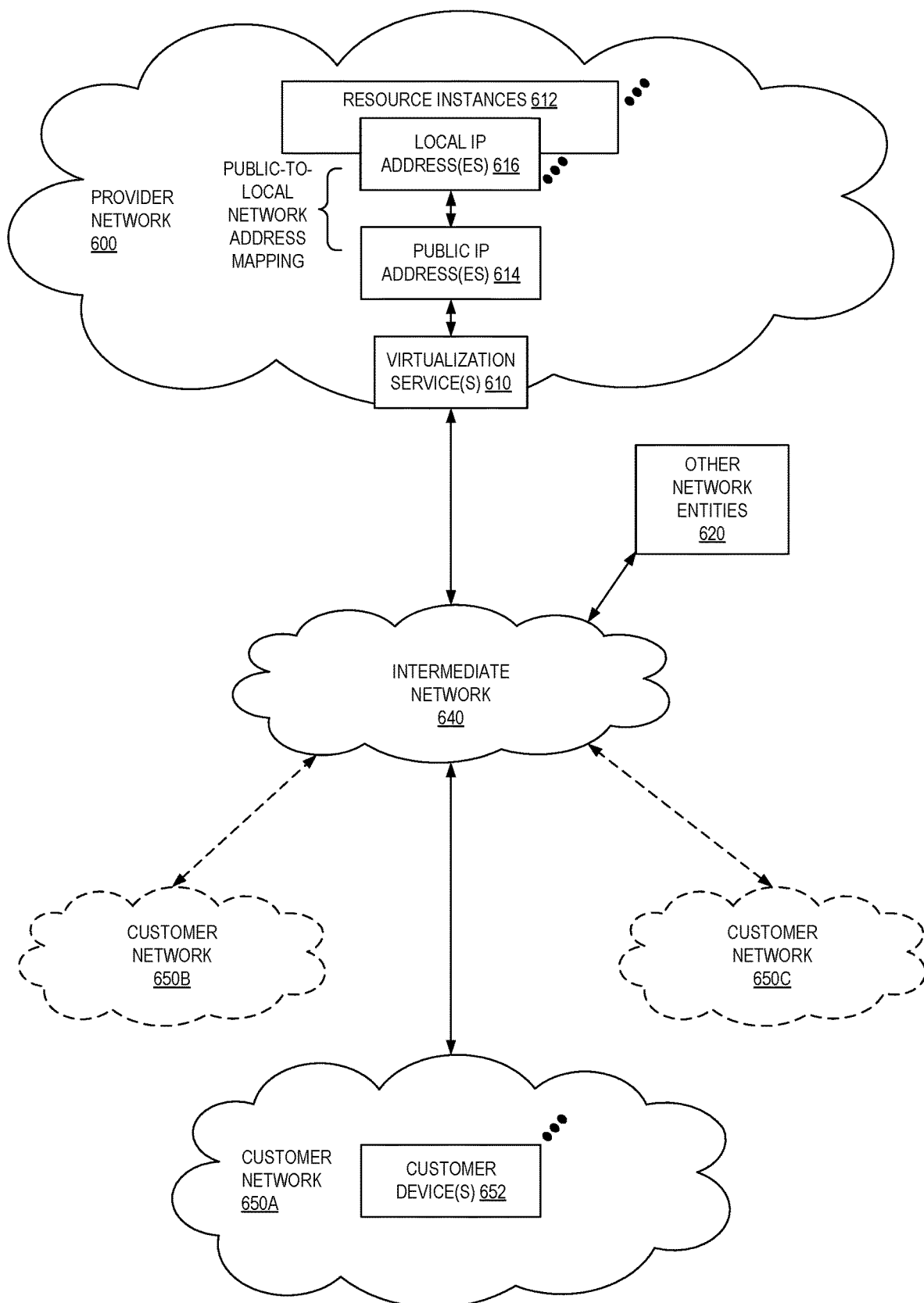
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
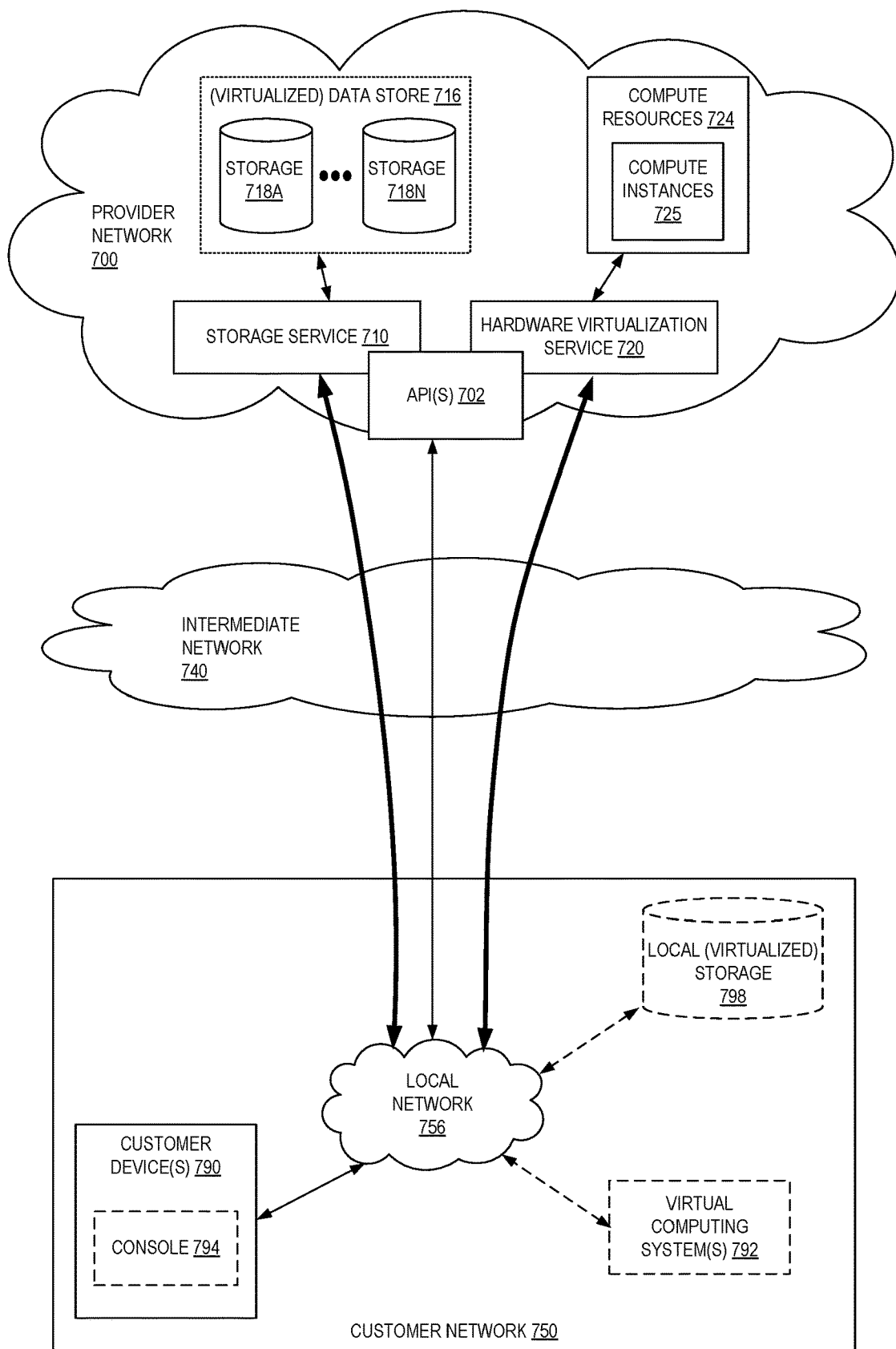
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
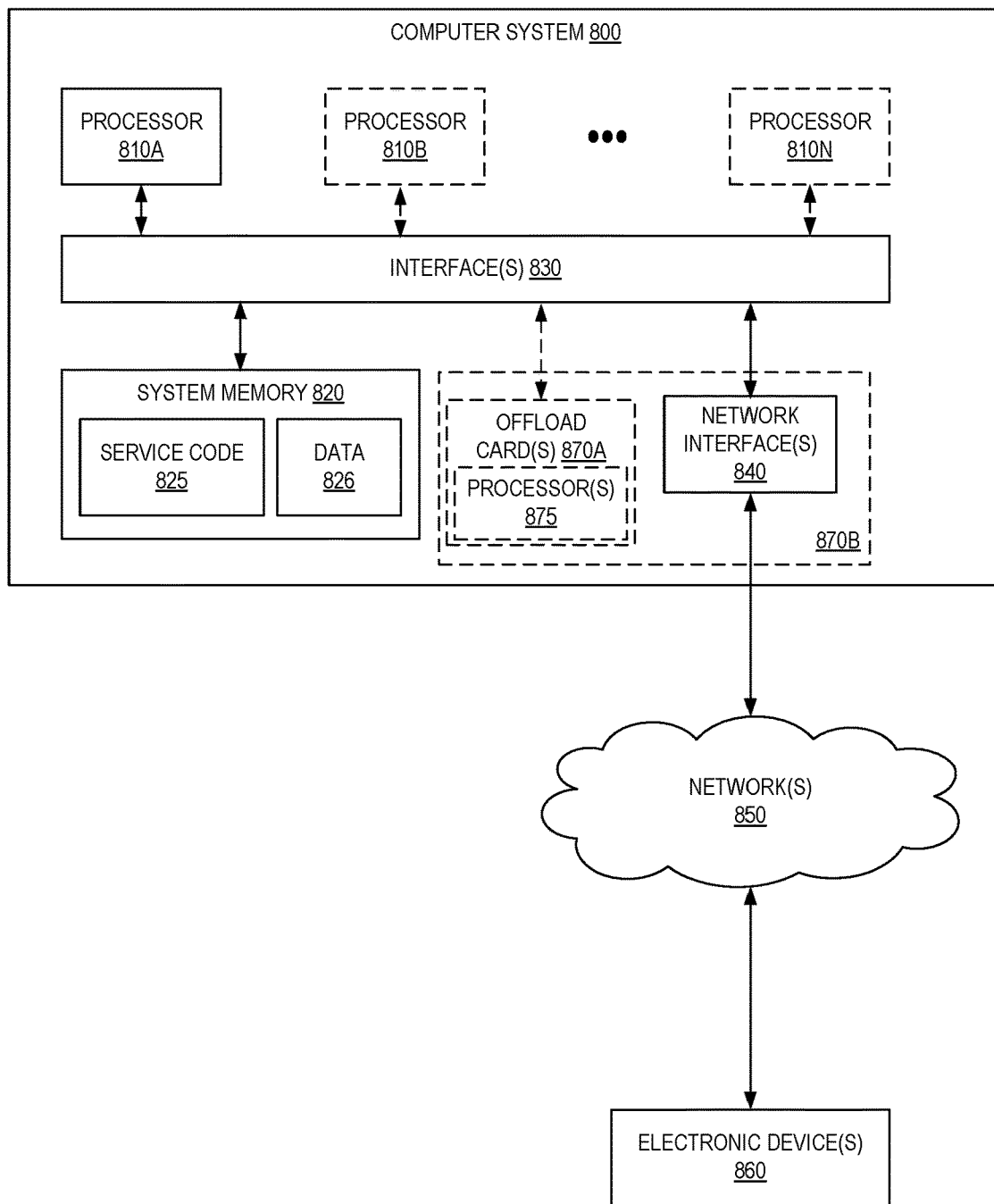
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 (e.g., executable to implement, in whole or in part, the project development environment policy service 140, the IDE guard application 142, or combinations thereof) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(®), Microsoft(®), Sybase(®), IBM(®), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by an integrated development environment (IDE) service of a cloud provider network, a request to access a software project development environment, wherein the software project development environment is associated with source code and a project development environment policy, and wherein the project development environment policy defines permissions for actions involving the source code in the software project development environment;
   detecting an invocation of a push command to be performed by version control software associated with the IDE service, wherein the push command identifies a remote repository to which changes to the source code are to be pushed;

determining that the push command is not permitted by the project development environment policy;

blocking execution of the push command; and sending, to a project development environment policy service, data reflecting application of the project development environment policy to the invocation of the push command, wherein the data includes a timestamp and an indication that execution of the push command was blocked.

2. The computer-implemented method of claim 1, wherein the software project development environment is a first software project development environment and the project development environment policy is a first project development environment policy, and wherein the method further comprises:

receiving, by the IDE service, a request to access a second software project development environment, wherein the second software project development environment is associated with second source code and a second project development environment policy that is different from the first project development environment policy;

detecting an invocation of a second push command to be performed by the version control software, wherein the push command identifies a second remote repository to which changes to the second source code are to be pushed;

determining that the second push command is permitted by the second project development environment policy; and allowing execution of the second push command.

3. The computer-implemented method of claim 1, further comprising obtaining, by an IDE guard application running on a computing device, the project development environment policy defined for the software project from the project development environment policy service, and wherein the project development environment policy identifies at least one repository associated with the software project.

4. A computer-implemented method comprising:

detecting, by an integrated development environment (IDE) guard application running on a computing device, an invocation of a push command to be performed by version control software running on the computing device, wherein the push command includes arguments identifying: one or more commits associated with source code of a software project, and a remote repository to which the one or more commits are to be pushed;

determining that the arguments of the push command violate a project development environment policy defined for the software project;

blocking execution of the push command; and sending, to a project development environment policy service of a cloud provider network, data reflecting application of the project development environment policy to the invocation of the push command, wherein the data includes a timestamp and an indication that execution of the push command was blocked.

5. The computer-implemented method of claim 4, wherein the source code is first source code associated with a first software project and the project development environment policy is a first project development environment policy, and wherein the method further comprises:

receiving a request to access second source code associated with a second software project, wherein the second software project is associated with a second project development environment policy that is different from the first project development environment policy;

detecting an invocation of a second push command to be performed by the version control software, wherein the second push command includes arguments identifying: one or more commits associated with the second source code, and a remote repository to which the one or more commits are to be pushed;

determining that the second push command is permitted by the second project development environment policy; and allowing execution of the second push command.

6. The computer-implemented method of claim 4, wherein the push command is a first push command, and wherein the method further comprises:

detecting an invocation of a second push command, wherein the second push command includes arguments identifying one or more commits associated with the source code of the software project;

determining that source code associated with the one or more commits includes security credentials; and blocking execution of the second push command.

7. The computer-implemented method of claim 4, further comprising obtaining, by the IDE guard application, the project development environment policy defined for the software project from the project development environment policy service, and wherein the project development environment policy identifies at least one repository associated with the software project.

8. The computer-implemented method of claim 4, further comprising:

sending, to the project development environment policy service, a request identifying a machine identifier of the computing device; and receiving, from the project development environment policy service, a security token generated for the computing device.

9. The computer-implemented method of claim 4, further comprising determining that a domain associated with the remote repository is not included in a set of allowed domains defined by the project development environment policy, and wherein the remote repository is at least one of: a public repository hosted by a repository hosting service, or a repository associated with a different software project.

10. The computer-implemented method of claim 4, further comprising:

detecting an invocation of a commit command to be performed by version control software running on the computing device, wherein the commit command identifies a local repository, a username, and an email address;

determining that the username or the email address does not match a configured username and email address for the local repository; and blocking execution of the commit command.

11. The computer-implemented method of claim 4, wherein the IDE guard application integrates with an integrated development environment (IDE) hosted by an IDE service provided by a cloud provider network, and wherein the IDE is accessed via a web browser.

12. The computer-implemented method of claim 4, further comprising installing one or more scripts configured to execute responsive to the version control software receiving a commit command or a push command, and wherein the one or more scripts, upon execution, determine that the arguments of the push command violate the project development environment policy defined for the software project.

13. The computer-implemented method of claim 4, further comprising:
  detecting an invocation of a commit command, wherein the commit command includes arguments identifying a repository not defined in the project development environment policy;
  prompting a user to provide configuration information for the repository, wherein the configuration information includes an email address and an allowed domain associated with the repository; and
  sending the configuration information to the project development environment policy service.

14. The computer-implemented method of claim 4, wherein the push command is a first push command, and wherein the method further comprises:
  detecting an invocation of a second push command, wherein the second push command includes arguments identifying a second remote repository;
  determining that a domain associated with the second remote repository is included in a set of allowed domains defined by the project development environment policy; and
  prompting a user to confirm the invocation of the second push command to the second remote repository.

15. The computer-implemented method of claim 4, further comprising:
  identifying, by the IDE guard application, a set of local repositories stored on the computing device; and
  sending, to the project development environment policy service, identifiers of the local repositories of the set of local repositories.

16. The computer-implemented method of claim 4, wherein the IDE guard application is installed as a plugin to an IDE.

17. A system comprising:
  a first one or more electronic devices to implement an integrated development environment (IDE) guard application, wherein the IDE guard application includes instructions that upon execution cause the IDE guard application to:
    receive a request to access a software project development environment, wherein the software project development environment is associated with source code and a project development environment policy, and wherein the project development environment policy defines permissions for actions involving the source code in the software project development environment,
    detect an invocation of a push command to be performed by version control software monitored by the IDE guard application, wherein the push command identifies a remote repository to which changes to the source code are to be pushed,
    determine that the push command is not permitted by the project development environment policy,
    block execution of the push command, and
    send, to a project development environment policy service, data reflecting application of the project development environment policy to the invocation of the push command, wherein the data includes a timestamp and an indication that execution of the push command was blocked; and
  a second one or more electronic devices to implement a project development environment policy service, wherein the project development environment policy service includes instructions that upon execution cause the project development environment policy service to:
    receive the data reflecting application of the project development environment policy to the invocation of the push command, and
    store the data in a data store in association with an identifier of the software project.

18. The system of claim 17, wherein the software project development environment is a first software project development environment and the project development environment policy is a first project development environment policy, and wherein the IDE guard application includes further instructions that upon execution cause the IDE guard application to:
  receive a request to access a second software project development environment, wherein the second software project development environment is associated with second source code and a second project development environment policy that is different from the first project development environment policy;
  detect an invocation of a second push command to be performed by the version control software, wherein the push command identifies a second remote repository to which changes to the second source code are to be pushed;
  determine that the second push command is permitted by the second project development environment policy; and
  allow execution of the second push command.

19. The system of claim 17, wherein the push command is a first push command, and wherein the IDE guard application includes further instructions that upon execution cause the IDE guard application to:
  detect an invocation of a second push command, wherein the second push command includes arguments identifying one or more commits associated with the source code of the software project;
  determine that source code associated with the one or more commits includes security credentials; and
  block execution of the second push command.

20. The system of claim 17, wherein the IDE guard application is installed as a plugin to an IDE.

* * * * *